United States Patent Office 2,789,582
Patented Apr. 23, 1957

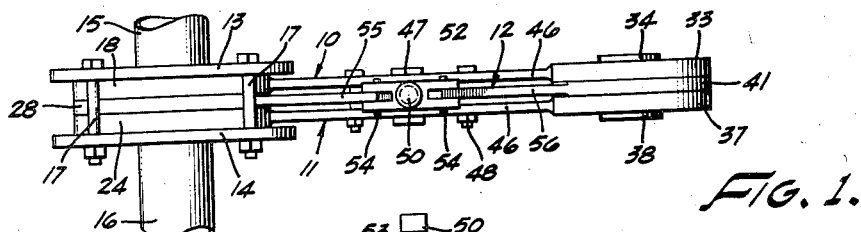

2,789,582

EXPANSIBLE SPECTACLE LINE-BLIND

Clinton H. Dunham, Fullerton, Calif.

Application July 13, 1954, Serial No. 443,106

5 Claims. (Cl. 138—94.3)

This invention relates to an expansible spectacle line-blind of the kind used in the oil and gas industry to blank off a pipeline in which flow may occur in either direction. Spectacle line-blinds are now used for this purpose, being more positive in their blanking action than ordinary valves. Either end of a spectacle line-blind may be placed between the flanges of a pipe-joint, the one end permitting flow through the pipe, and the other end stopping it. No great difficulty is encountered in making the blank end seal the line, but the flow end is difficult to seal against the pipe flanges under heavy pressure.

It is an object of this invention to provide an expansible line-blind which permits either end of the spectacle to be expanded against the pipe-flanges with great force.

A further object of the invention is to provide a line-blind which takes into account variations in the distance between pipe flanges when a joint is broken and allows for mechanical contraction and expansion to compensate for this variation.

In terms of broad inclusion, my expansible spectacle line-blind consists of three parallel parts each having the spectacle shape, the outer two of these parts being fixed ball-races and the inner one being the ball-carrier. The individual races extend for only a short distance and are tapered in depth. The ball-carrier is hinged, with provision being made to change the angle of the ball-carrier relative to the ball-races. The balls may start, and this is true for either end of the line blind, at the greatest depth of the ball-races, and by being moved into the shallow end thereof they expand the outer members against the flanges. The outer members, on the open end of the line-blind are provided with interlocking sealing means; on the closed end of the line-blind no such means are required but the outer members are provided with centering bosses.

In the accompanying drawing illustrative of a presently preferred embodiment of my invention, Fig. 1 is a plan view of a line-blind with the open end seated in a pipe joint;

Fig. 2 is an elevational view of the same.

Fig. 3 is an exploded sectional view taken on the line of section 3—3 of Fig. 2.

Fig. 4 is an elevational view of one of the outer members of my line-blind, the view-point being from the line 4—4 of Fig. 3;

Fig. 5 is an elevational view of the center member of my line-blind, the view-point being from the line 5—5 of Fig. 3; and Fig. 6 is a section on line 6—6 of Fig. 4, on an enlarged scale, and showing the taper of one of the ball-races.

Having reference now to the details of the drawing, my invention comprises two fixed spectacles, 10 and 11, and a movable spectacle 12 between them. As herein illustrated, all three are clamped between flanges 13 and 14 of pipes 15 and 16, by flange bolts 17. The spectacle 10 has, on its open or flow-permitting end, an eye-piece 18, having a central orifice 19 surrounded by a pipe-extension 20 on its side toward the spectacle 11. The extension 20 has an interior annular groove 21 provided with an O-ring 22. Around the orifice 19 are a plurality of tapered grooves, or ball-races, 23, deeper and wider at one end than at the other the tapers being in like directions of rotation. Similarly the spectacle 11 has, at its open end, an eye-piece 24, having a central orifice 25 surrounded by a pipe-extension 26 on its side towards the spectacle 10. The extension 26 is somewhat longer than the extension 20 and fits therewithin, being sealed by the O-ring 22. Ball-races 27 correspond to ball-races 23 in number, location and taper.

Between the eye-piece 18 and the eye-piece 24, the spectacle 12 presents a movable eye-piece 28, having a central orifice 29 large enough to fit closely around the pipe-extension 20, by which it is centered. Balls 30, corresponding in number to the ball-races 23 and 27 and adapted to run therein, are held in individual sockets.

At the other end of the spectacles 10 and 11 are what may be termed blinds, inasmuch as they blind the pipe line when inserted thereinto. The spectacle 10 has a blind 33 with a boss 34 on its outer side which fits in the pipe 15, and a smaller boss 35 and ball-races 36 on its opposite side. The spectacle 11 has a blind 37 with a boss 38 on its outer side, and a smaller boss 39 and ball races 40 on its inner side. The movable spectacle 12 has a member 41 with a central orifice 42 which receives and centers the bosses 35 and 39. Balls 43, corresponding in number to the ball-races 36 and 40, are held in individual sockets.

Connecting the eye-pieces 18 and 24 respectively with the blinds 33 and 37 are bridges 46. A bar 47 slidably traverses both the bridge 46, and to hold the entire line-blind together when it is not in use bolts 48 are provided.

It will be seen that when either the eye-pieces 18, 24, and 28 or the blinds 33, 37, and member 41 are between the flanges 13 and 14, rotation of the eye-piece 28 or of the member 41 so as to bring the balls 30 or 43 to the shallow end of their respective ball races will spread the line-blind against the pipe flanges, nevertheless maintaining the sealed relationship of the extension 26 within the extension 20 if that end of the line-blind be in use. Rotation is effected by means of a bolt 50 which turns in a thrust bearing 51 in the bar 47. A cross-head 52 is threadedly carried by the bolt 50 and has slots 53 in which may slide pins 54 on the ends of crank-arms 55 and 56 connected respectively with the eye-piece 28 and the member 41. Thus, when either end of the spectacle line-blind is inserted between the flanges 13 and 14, simple turning of the bolt 50 will expand the spectacle against the flanges, making a seal of the power required by the high pressures encountered, and either opening sealed communication between the pipes, or closing it completely.

As modifications of my invention will occur to those skilled in the art without departure from the spirit of my invention, I wish the scope of my invention to be held commensurate with the full scope of the appended claims.

I claim:

1. A line-blind comprising a pair of spaced members having annular portions for engaging the flanges of an opened pipe-joint, said members having a plurality of grooves arranged in a circle, said grooves increasing in depth from their one ends to their other ends and being arranged in opposed pairs, a member disposed between said first-named members having a plurality of balls equal in number to said pairs of grooves and arranged in individual sockets and arranged to rotate in said pairs of grooves, means for preventing the escape of fluid from said pipe joint between the flange-engaging portions of said first-named members when said members are spaced apart and means for rotating said last-named member to cause said balls to move between the deep ends of said grooves and the shallow end thereof, whereby said first-named members are forced in sealed engagements against said pipe flanges.

2. A line-blind comprising a first member adapted to be inserted between pipe flanges and having a plurality of grooves arranged in a circle, a second member likewise adapted to be inserted between said pipe-flanges and having a plurality of grooves matching said first grooves in opposed pairs, said pairs of grooves increasing in depth in like directions of rotation, a third member insertable between said first and second members, balls carried by said third member in fixed rotative relation thereto on a circle corresponding to the circle of said grooves, means for holding said first and second members against lateral displacement in relation to said flanges, and means for rotating said third member to cause said balls to move between the deep end and the shallow end of said opposed pairs of grooves, said balls forcing said first and said second members apart when said balls are moved toward said shallow ends.

3. A line-blind according to claim 2, in which said first, second and third members have aligned orifices centered within said grooves and said balls, and said holding means comprise pipe extensions on said first and said second members telescopically engaging through the orifice of said third member, and means for sealing said pipe-extensions slidably one to another.

4. A line-blind according to claim 2, in which said holding means include aligned bosses on opposed sides of said first and second members, and other bosses on the other sides of said first and second members, said third member having a central recess receptive to said aligned bosses for holding said first, second, and third members in alignment, and said other bosses aligning said line-blind with said pipe-flanges.

5. A line-blind for a flanged pipe-joint comprising two spectacle-like elements each consisting of an eye-piece and a blind connected by a bridge, the eye-piece and blind of one element matching respectively with the eye piece and blind of the other, said eye-pieces have telescoping members sealed slidably one to another, said blinds having exterior bosses fitting within opposed pipes forming said joint, each matched pair of eye-pieces and blinds having short matching grooves arranged in a circle of greater diameter than said pipes, said grooves of each pair being deeper at one end than the other in like directions of rotation, a member insertable between either of said matched pairs and having balls held rotatably and exposed on both sides of said member, said balls conforming in number and in annular arrangement to said grooves, and means for rotating said insertable member for moving said balls to either the shallow end or the deep end of said grooves to cause expansion and contraction of said matched pairs against the flanges of said joint.

References Cited in the file of this patent
UNITED STATES PATENTS

| | | |
|---|---|---|
| 442,458 | Ross | Dec. 9, 1890 |
| 1,391,987 | Whaley | Sept. 27, 1921 |
| 1,727,677 | Siebert et al. | Sept. 10, 1929 |
| 2,045,086 | Kastner | June 23, 1936 |
| 2,532,346 | Stancliff | Dec. 5, 1950 |
| 2,649,117 | Hamer | Aug. 18, 1953 |